US 6,588,113 B2

(12) United States Patent
Bozikis et al.

(10) Patent No.: US 6,588,113 B2
(45) Date of Patent: Jul. 8, 2003

(54) SHAVING RAZOR HANDLE WITH COVERED CORE HAVING AN EXPOSED AREA FOR MARKING

(75) Inventors: Ioannis Nikolaos Bozikis, Athens (GR); Kostas Christos Korres, Athens (GR)

(73) Assignee: BIC Violex, S.A. (GR)

( * ) Notice: Subject to any disclaimer, the term of this patent is extended or adjusted under 35 U.S.C. 154(b) by 0 days.

(21) Appl. No.: 10/053,562

(22) Filed: Jan. 24, 2002

(65) Prior Publication Data

US 2002/0059733 A1 May 23, 2002

Related U.S. Application Data

(62) Division of application No. 09/484,785, filed on Jan. 18, 2000, now Pat. No. 6,370,783.

(51) Int. Cl.[7] .................................................. B26B 21/00
(52) U.S. Cl. ........................... 30/526; 16/430; 16/431; 264/132; 264/173.17; 264/177.17
(58) Field of Search ................. 30/526, 50; 264/132, 264/173.17, 177.17; 16/430, 431

(56) References Cited

U.S. PATENT DOCUMENTS

| 2,235,841 | A |   | 3/1941 | Monnet | 30/526 |
| 3,430,994 | A |   | 3/1969 | Keeler, II | 264/177.17 |
| 3,716,433 | A |   | 2/1973 | Plummer | 16/110 R |
| 4,619,799 | A |   | 10/1986 | Teerling | 264/171.26 |
| 4,949,457 | A |   | 8/1990 | Burout, III | 30/526 |
| 5,027,511 | A |   | 7/1991 | Miller | 30/526 |
| 5,155,878 | A | * | 10/1992 | Dellis | 16/111 R |
| 5,403,534 | A |   | 4/1995 | Kim | 264/249 |
| 5,553,384 | A |   | 9/1996 | Kim | 30/526 |
| D378,623 | S |   | 3/1997 | Wonderley | D28/48 |
| 5,781,963 | A | * | 7/1998 | Maru et al. | 16/111 R |
| 6,296,732 | B1 | * | 10/2001 | Inlow et al. | 156/209 |

FOREIGN PATENT DOCUMENTS

CA   2004793   6/1989

OTHER PUBLICATIONS

English language abstract of Japanese 53105563 dated Sep. 1978.
English language abstract of Japanese 4023453 dated Jan. 1992.
Photograph of Sample Noxzema Skin Fitness Shaver and Packaging (showing Front and Back of Shaver).

* cited by examiner

Primary Examiner—Douglas D. Watts
(74) Attorney, Agent, or Firm—Pennie & Edmonds, LLP

(57) ABSTRACT

A shaving razor having a razor handle comprising an extruded substantially rigid inner core and a compatible covering layer over the rigid inner core except for a select region at which an exposed portion of inner core is provided. A marking, such as printed matter and/or any other type of indicia, may thereby be readily provided on the inner core rather than on the covering layer. The marking is preferably provided on a flat surface of the handle. Additionally, the razor handle may be formed by an extrusion process utilizing a die set which forms a handle with a cross-section which is at least partially asymmetrical.

13 Claims, 5 Drawing Sheets

US 6,588,113 B2

SHAVING RAZOR HANDLE WITH COVERED CORE HAVING AN EXPOSED AREA FOR MARKING

This is a divisional of application Ser. No. 09/484,785 filed Jan. 18, 2000, now U.S. Pat. No. 6,370,783.

BACKGROUND OF THE INVENTION

The present invention relates to a shaving razor and, more particularly, to a shaving razor having a rigid inner core covered by a covering layer, the covering layer leaving an area of the inner core exposed for marking subject matter thereon.

The desirability of providing a wet shaving razor with a rubberized handle which provides a more comfortable and secure grip, especially when held with wet and sometimes soapy hands, has been recognized. For example, U.S. Pat. Nos. 5,403,534, 5,553,384, and 5,727,328 to Jisu Kim disclose a shaving razor having a rubberized handle comprising an extruded substantially rigid inner core and a co-extruded, compatible thermoplastic rubber layer covering the rigid inner core.

It is also desirable to be able to prominently display a manufacturer's brand name and/or logo on a product or other desired printed matter or indicia. With regard to a shaving razor, the razor handle is an ideal location for the brand name and logo because the handle generally contains the most surface area of any part of the shaving razor.

However, a soft thermoplastic rubber layer on a handle of the type disclosed in the patents to Kim, is not a desirable surface on which to print. Instead, a hard plastic surface provides a better medium on which to print because it allows for more flexibility in the types of techniques that may be used for printing and, generally, allows for better print quality and sharper print contrast than soft thermoplastic rubber.

Accordingly, there exists a need for a shaving razor with a handle having both a desired gripping surface as well as a desirable surface on which subject matter, such as written material (e.g., a brand name) and/or indicia (e.g., a logo) may be marked.

SUMMARY OF THE INVENTION

In accordance with the principles of the present invention, a shaving razor having a shaving head holding one or more fixed or replaceable razor blades in appropriate shaving position is provided with a razor handle attachable to the shaving head. The razor handle includes a substantially rigid inner core with a layer covering the rigid inner core except for a portion thereof. The lack of covering layer over a portion of the inner core results in an exposed portion of the inner core which is more amenable to receiving a marking (e.g., bearing printed matter) than the material of the covering layer.

Another aspect of the present invention is a method of producing a razor handle for a shaving razor having an inner core and a covering layer over most of the inner core except along a portion thereof at which the inner core is exposed. The method further includes the step of marking on the exposed portion of the inner core any desired subject matter, marking of the inner core material being more readily achievable than on the covering layer.

In a preferred embodiment, the inner core material and the covering layer material are fed simultaneously in an extrudable state to a coaxial extruder die. The materials are co-extruded to form a one-piece razor handle having an inner core of the substantially rigid material covered by a preferably compatible covering layer, except along a portion of the core. The coextruded handle need not have a completely symmetrical cross-section, and may have a substantially asymmetrical cross-section.

Preferably, the covering layer is compatible with the material of the rigid inner core. Alternatively, the covering layer may include a tie layer of compatible material provided between the rigid inner core and the covering layer as a bonding medium.

BRIEF DESCRIPTION OF THE DRAWINGS

The invention will be better understood from the following detailed description of an exemplary embodiment thereof in conjunction with the accompanying drawings in which.

Throughout the figures of the drawings the same reference numerals or characters are used to denote like components or features of the illustrated razor.

DETAILED DESCRIPTION OF THE INVENTION

Figure 1:
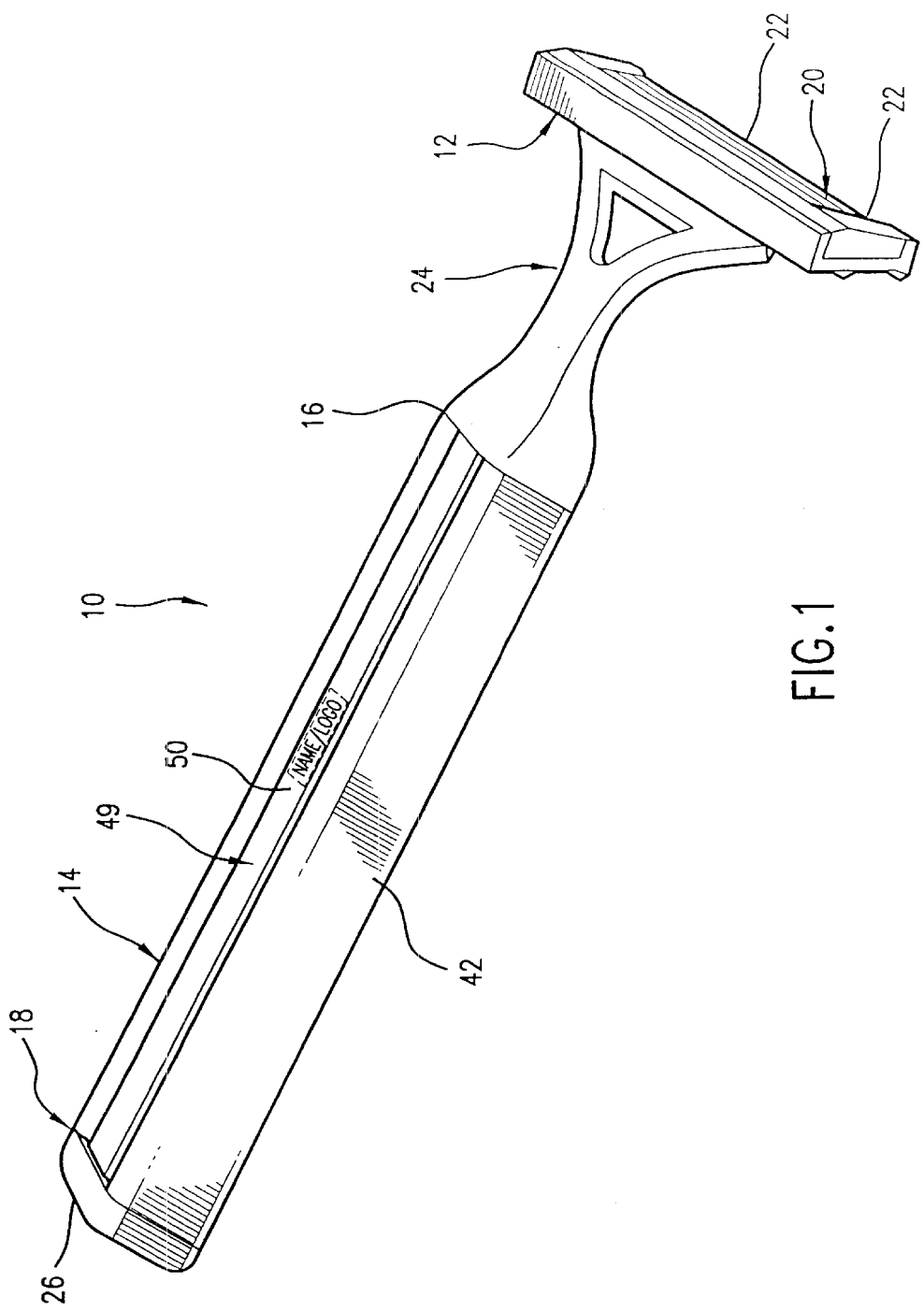
FIG. 1 is an isometric view of an exemplary shaving razor in accordance with a preferred embodiment of the present invention.

Referring to FIG. 1, there is shown an exemplary razor 10 formed in accordance with the principles of the present invention. Razor 10 includes a shaving head 12 and a razor handle 14 having a top end 16 and a bottom end 18. The shaving head 12, which may be of any conventional design, such as an assembly of molded plastic, is coupled to top end 16 of razor handle 14 and carries one or more metal blades 20, with the cutting edges 22 thereof in appropriate positions for effective shaving.

Preferably, handle 14 is made of a suitable length and circumference and is otherwise shaped and configured for easy grasp by a user. Those skilled in the art will recognize that suitable length and cross-sectional dimensions of the razor handle may vary over a wide range. If handle 14 is hollow, then the minimum wall thickness of handle 14 must be sufficient to provide handle 14 with substantial rigidity and will depend upon the characteristics of the material or materials from which handle 14 is formed as well as the cross-sectional shape of handle 14. It will be appreciated that the cross-sectional shape of handle 14 need not be completely symmetrical, and may be at least partially asymmetrical, as described in further detail below.

In the embodiment of FIG. 1, shaving head 12 is coupled to top end 16 of razor handle 14 via a molded plastic neck piece 24 coupled to top end 16 of handle 14. A molded plastic end plug 26 is preferably coupled to bottom end 18 of handle 14.

Shaving head 12 and neck piece 24 may be connected in any desired manner. Preferably, shaving head 12 and neck piece 24 are connected by a pivotable connection. They may, however, be connected by a nonpivotable connection. In addition, shaving head 12 may either be a replaceable cartridge unit or a razor head of a disposable razor (and thus not designed to be readily decoupled from neck piece 24). If desired, shaving head 12 and neck piece 24 may be integrally formed.

Handle 14, neck piece 24, and end plug 26 may be coupled together in any desired manner, as will be known to those skilled in the art. For example, handle 14, neck piece 24, and end plug 26 may be thermal, kinetic, or ultrasonically welded, press-fitted, friction-fitted, adhered with a bonding agent, or coupled in any other manner which securely couples shaving head 12 to handle 14 via neck piece 24.

Figure 2:
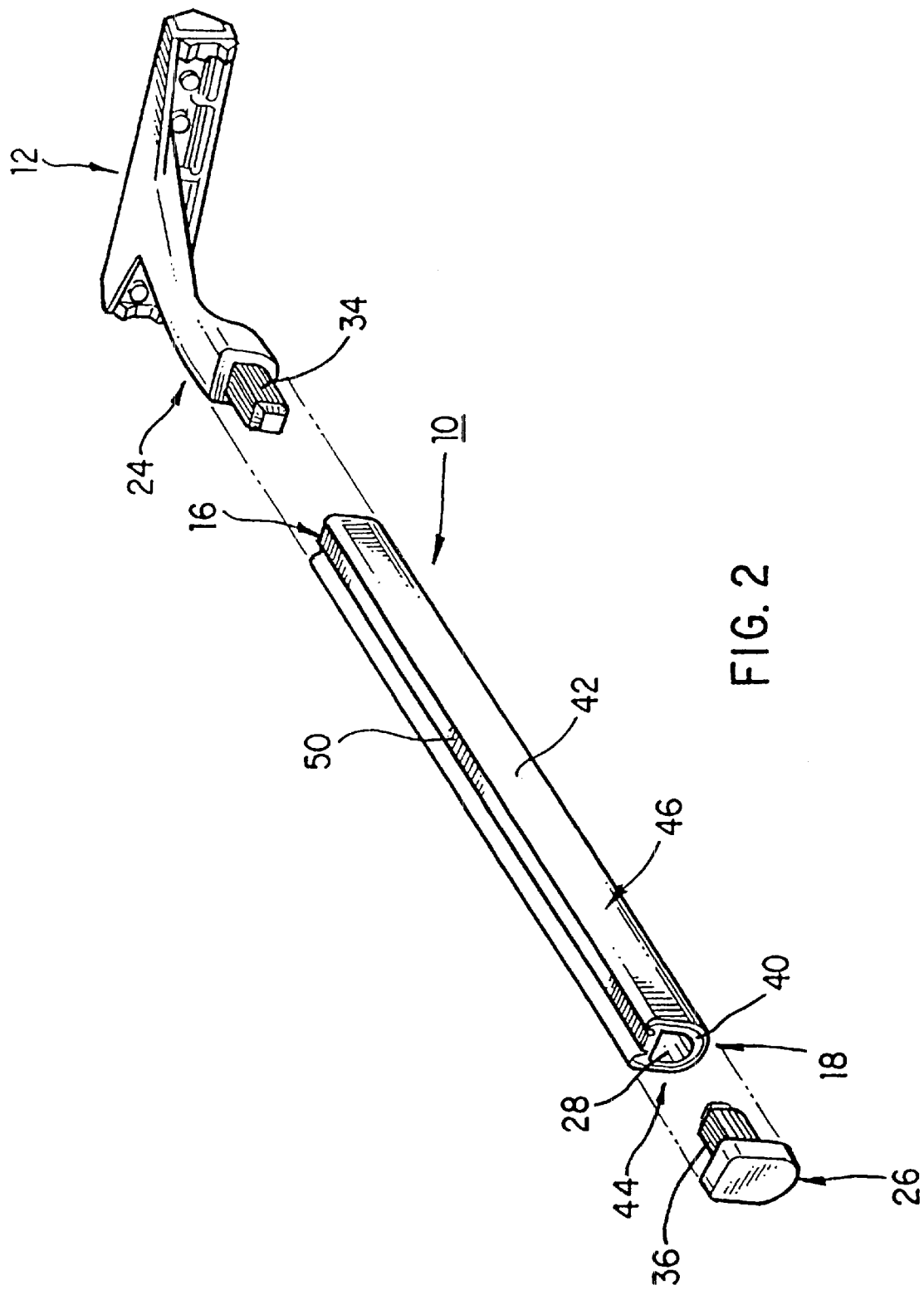
FIG. 2 is a partially exploded isometric view of the shaving razor of FIG. 1.
Figure 3:
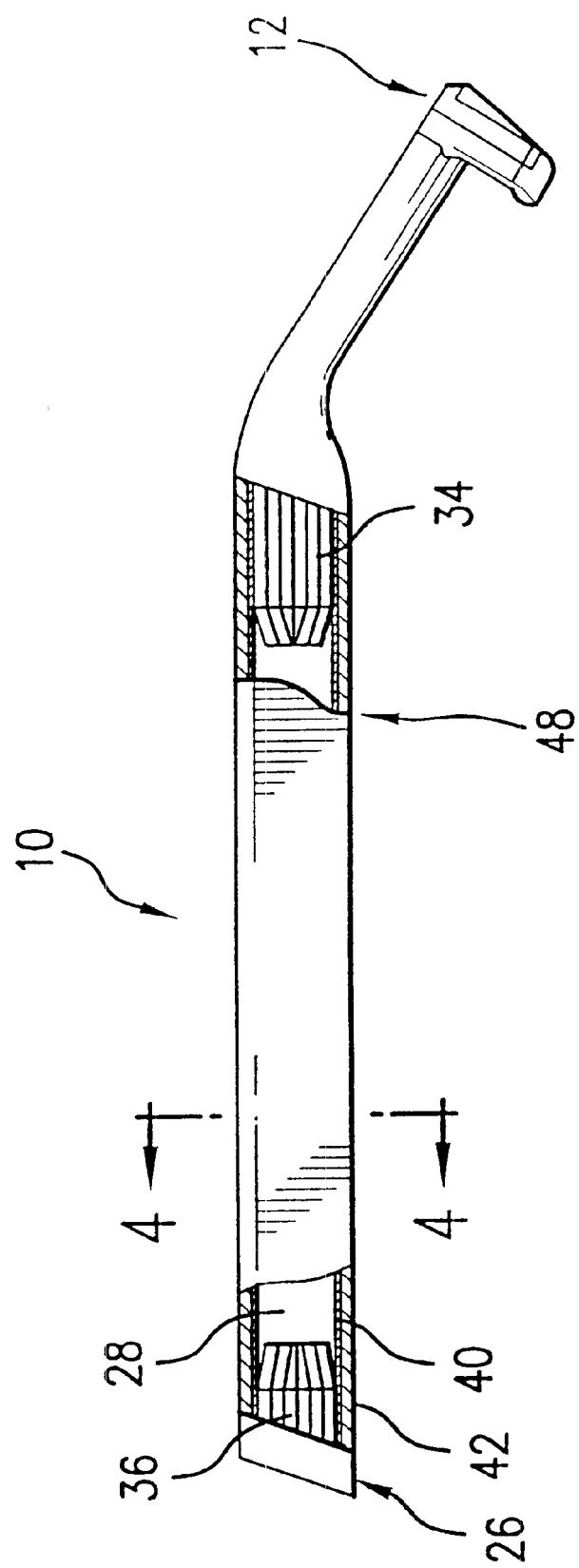
FIG. 3 is a side elevational view, partially in section, of the shaving razor of FIG. 1.

In the embodiment of FIGS. 2 and 3, handle 14 is formed with a substantially hollow interior 28 and neck piece 24 and end plug 26 include respective insert members 34 and 36, each sized to fit within the hollow ends of handle 14 resulting from forming handle 14 with a hollow interior 28. In this manner, neck piece 24 and end plug 26 may each be attached to handle 14 by press fitting the respective insert members 34 and 36 into the ends of handle 14. If desired, glue or other adhesive agents may be used to further secure insert members 34 and 36 in respective ends 16 and 18 of hollow handle 14. Alternatively, another means of securing at least one of neck piece 24 and end plug 16 to handle 14 may be used, such as welding. It is noted that handle 14 of razor 10 need not be hollow, and neck piece 24 and end plug 26, if any, may be attached to handle 14 by means other than the insert members 34, 36, such as described above.

In accordance with the principles of the present invention, razor handle 14 has an inner core 40 covered by a covering layer 42. Covering layer 42 preferably extends around the circumference of handle 14 and preferably from end 16 to end 18 to impart a desired effect, such as a visual effect or varied texture. In a preferred embodiment, covering layer 42 is provided to increase gripping comfort. Thus, for an improved ergonomic configuration, at least longitudinal sides 44, 46 of handle 14 are sufficiently covered with covering layer 42 to provide gripping in a variety of gripping positions, thus facilitating the different shaving needs of both men and women. Moreover, the front side 48 of handle 14, alongside blade cutting edges 22, preferably is covered with covering layer 42, at least for use by men. It will be appreciated that handle back side 49 may alternatively or additionally be covered with a covering layer 42.

Figure 4:
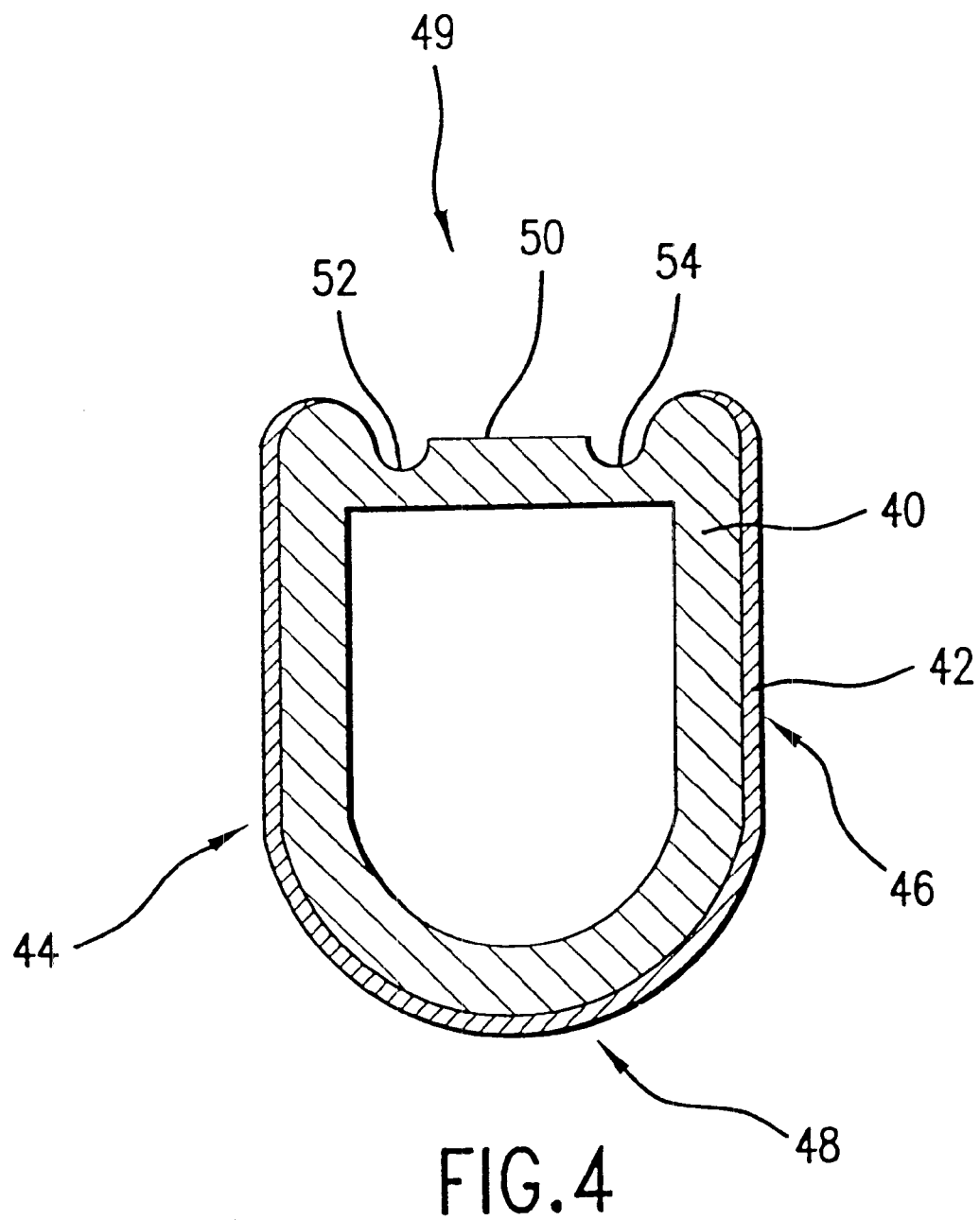
FIG. 4 is a cross-sectional view of the handle of the shaving razor of FIG. 1 taken along section line 4—4 of FIG. 3.

The material from which inner core 40 is formed typically more readily receives a marking (such as printed matter, an imprint, an engraving, etc.) than does the material of covering layer 42. Moreover, a marking typically lasts longer on the material of inner core 40 than on the material of covering layer 42. Advantageously, as shown in FIGS. 1, 2, and 4, covering layer 42 does not cover the entire handle 14. Instead, a portion 50 of inner core 40 is left exposed. This exposed portion 50 provides a surface area of inner core 40 which may be marked as desired, such as by the manufacturer or seller. For example, subject matter, such as written material (e.g., a brand name) and/or other indicia (e.g., a logo), may be provided on exposed portion 50. Preferably, exposed portion 50 is substantially flat to facilitate marking thereon. For instance, the exemplary handle illustrated in FIGS. 2 and 4 has a closed U-shaped cross-section with a flat side connecting the ends of the "U", exposed portion 50 being formed along the flat side. As shown in the Figures, exposed portion 50 is preferably formed as a longitudinal strip of core 40, extending from top end 16 to bottom end 18 of handle 14, along which covering layer 42 is not applied. Such configuration of exposed portion 50 is preferable for simplifying manufacture, as will be appreciated particularly with reference to the description of preferred methods of manufacturing handle 14 provided below. However, other configurations are within the scope of the present invention.

Advantageously, for aesthetic purposes, handle 14 includes a pair of grooves 52, 54 along the edges of exposed portion 50. For instance, grooves 52, 54 permit a distinct demarcation between flexible layer 42 and exposed portion 50.

In a preferred embodiment, the material from which covering layer 42 is formed is selected to impart handle 14 with a grasping surface which is soft and non-slippery, even in a wet and soapy environment, as well as to increase grasping comfort. Moreover, covering layer 42 preferably is formed from a relatively soft material which increases user comfort while grasping handle 14. If desired, covering layer 42 may be formed from a material which is sufficiently compressible such that compression of the layer increases user comfort while grasping handle 14. Alternatively, or additionally, the material of covering layer 42 is selected to impart higher friction to handle 14 than imparted by the material of inner core 40. A preferred material for forming covering layer 42 is an elastomer, most preferably a thermoplastic elastomer, capable of imparting such properties to the finished covering layer.

In accordance with the principles of the present invention, if a high friction material is used, then only a very thin layer of material is necessary in order to form covering layer 42. In particular, the material preferably is applied in a thin enough layer such that the bulk properties of the material (such as compressibility) are not readily distinguishable and the surface properties (such as friction) dominate the sensations imparted by the material to the user grasping the layer formed therefrom. However, covering layer should have sufficient thickness to achieve a complete coverage of inner core 40 under the manufacturing process used. The thickness of such a covering layer preferably is less than 0.1 mm, and most preferably approximately 0.05 mm to approximately 0.075 mm. However, layers thinner than 0.05 mm which provide adequate coverage of inner core 40 yet which have surface properties dominating over bulk material properties are within the scope of the invention as well. Similarly, layers thicker than 0.075 mm, such as 3 mm, may be appropriate, depending on the material selected for covering layer 42. It will be appreciated that because the surface properties of covering layer 42 impart the desired tactile qualities to handle 14, handle 14 may have a smooth exterior rather than a fluted configuration, as disclosed in the above-mentioned patents issued to Kim, or another type of surface configuration or texture intended to impart tactile sensations now adequately provided by the covering layer material itself.

Inner core 40 is preferably formed of a material capable of maintaining the desired handle shape during and throughout repeated use of razor 10. Preferably, the material of inner core 40 is selected to result in a rigid inner core and is amenable to processing in a low cost manner (e.g., a process with low energy requirements such as a relatively low temperature process). For example, a thermoplastic material may be used to form core 40, such material permitting reprocessing of scrap material. Additionally, inner core 40 preferably is formed from a material which is compatible with the material of covering layer 42 so that covering layer 42 will be securely attached to inner core 40. Most preferably, inner core 40 and covering layer 42 are sufficiently compatible to permit direct bonding of the materials, such as a result of chemical compatibility and bonding.

Exemplary compatible covering layer and inner core material combinations, which may be used with any method of manufacturing handle 14, include an ethylene-propylene-diene monomer covering layer, such as SANTOPRENE sold by Monsanto, Inc. of St. Louis, Mo., on a high density polyethylene inner core; a halogenated polyolefin covering layer, such as ALCRYN sold by DuPont Polymer Products of Wilmington, Del., on a poly-vinylidene chloride inner core; and a covering layer of a hydrogenated adduct of a styrene—butadiene block copolymer with maleic anhydride, such as CRATON sold by Shell Chemical Company of Houston, Tex., on a polystyrene inner core. Preferably, covering layer 42 is formed from SANTOPRENE and inner core 40 is formed from polypropylene.

In a preferred embodiment, handle 14 is formed by co-extruding inner core 40 and covering layer 42. As known to those skilled in the art, extrusion requires less expensive processing equipment and results in faster production rates than are achievable by injection molding. In order for the inner core material and the covering layer material to be co-extrudable they should have appropriate melting points such that they are both in a molten state and have suitable viscosities while passing through a co-extrusion die. Moreover, as one of ordinary skill in the art will appreciate, the materials of inner core 40 and covering layer 42 should have relatively low melt flow indexes (preferably 4 g/10 min or lower) to facilitate extrusion. Finally, for good adhesion, molecules of each material must be capable of mixing and interweaving to form a strong bond at the interface between the inner core and the thermoplastic layer.

Preferably at least, for purposes of extrusion, inner core 40 and covering layer 42 are formed from thermoplastic materials. Suitable materials for forming inner core 40 of handle 14 by extrusion include polyolefin (including polyethylene, such as high density polyethylene and polypropylene), polyvinylidene chloride, and polystyrene. In a preferred embodiment, inner core 40 is formed from polypropylene. The material used to form covering layer 42 preferably is co-extrudable with the material of inner core 40 and, once co-extruded, must also provide good adhesion with inner core 40 so that covering layer 42 does not become detached therefrom during use or storage. In a preferred embodiment, covering layer 42 is formed from a thermoplastic elastomer such as ethylenepropylene-diene monomer.

As is well known to those skilled in the art, if the materials chosen for inner core 40 and covering layer 42 do not mix and interweave to a sufficient extent at their interface to provide good adhesion, an appropriate tie layer may be formed between inner core 40 and covering layer 42 to provide the necessary adhesion. If inner core 40 and covering layer 42 are formed by co-extrusion, such a tie layer may be co-extruded with the materials from which inner core 40 and covering layer 42 are formed, using an appropriate coaxial extrusion die as described in further detail below. In this manner, an inner core material and a covering layer material which are otherwise incompatible for forming the coextruded razor handle in accordance with the invention may be made compatible by using a tie layer.

Figure 5:
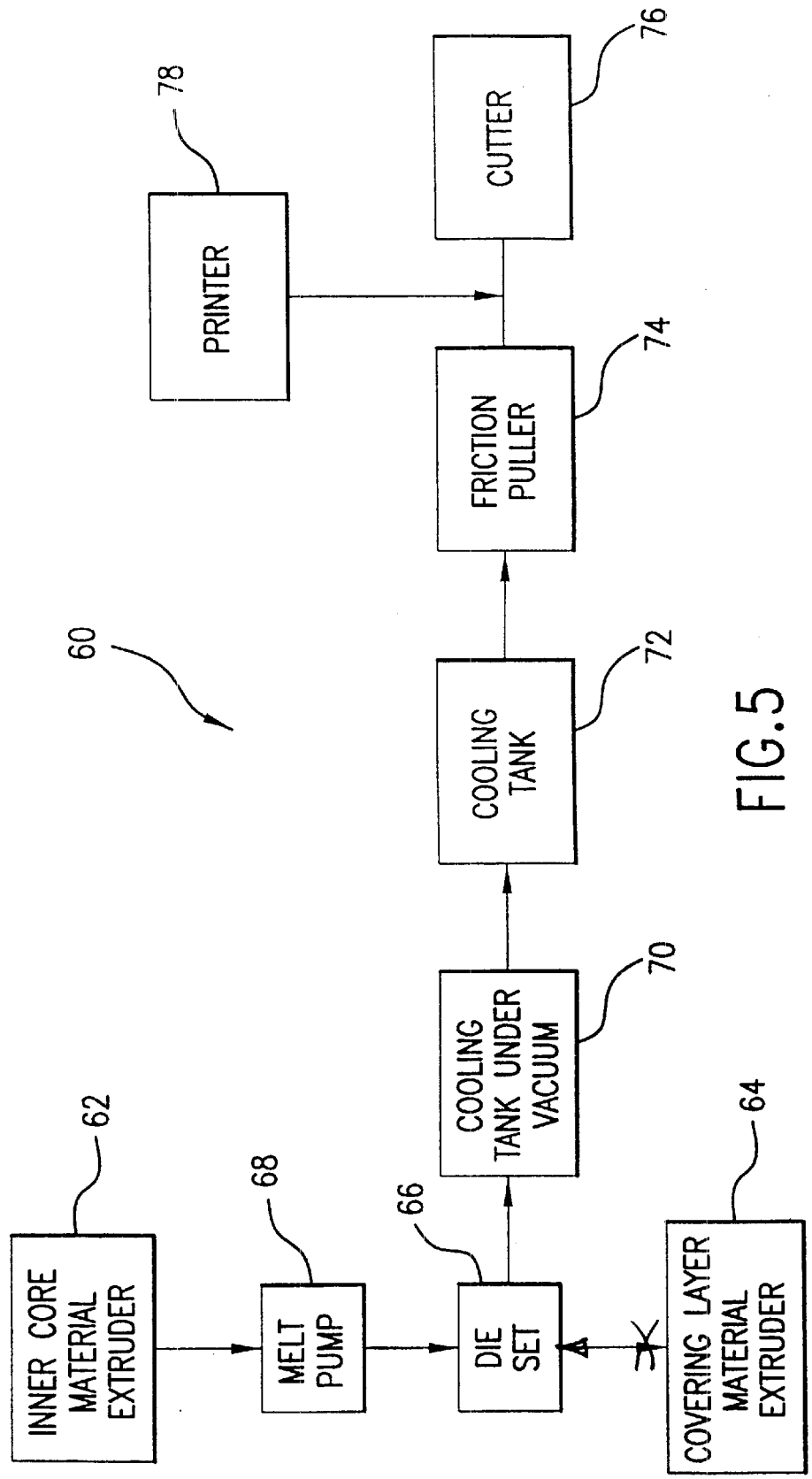
FIG. 5 is a schematic block diagram illustrative of an exemplary process, in accordance with a preferred embodiment of the invention, for fabricating the handle of the exemplary shaving razor of FIG. 1.

Turning now to FIG. 5, there is shown a block diagram schematically illustrating an exemplary co-extrusion process 60 which may be used to fabricate handle 14 of razor 10 by co-extrusion. Separate conventional extruders 62 and 64 are respectively used to simultaneously extrude the material of rigid inner core 40 and the compatible material of covering layer 42 of handle 14. If a tie layer is to be used, then an additional extruder for such material (not shown) is provided.

The outputs of extruders 62 and 64 are provided to a dual input coaxial die set 66. Preferably, though not necessarily, core material is passed through a melt pump 68 before passing through die set 66. A similar melt pump may be provided between extruder 64 and die set 66 as well.

Coaxial die set 66 is designed such that the material of inner core 40 and the compatible material of covering layer 42 are co-extruded in the desired handle cross-sectional shape. Preferably, die set 66 is shaped such that the resulting extruded handle has at least one flat side along which exposed portion 50 is provided to facilitate printing thereon.

In accordance with the principles of the invention, die set 66 may be fabricated with a sufficiently high standard of surface finish, dimension, and geometry to allow for extrusion of a handle which has a cross-section which is not completely symmetrical. For example, die set 66 may impart a closed "U" shape cross-section to handle 14, resulting in a handle such as shown in FIGS. 2 and 4. Such shape is only symmetrical about one plane and is otherwise asymmetrical. High cylindricity of die set 66 (parallelism between the elements of die set 66) is also important to successfully extrude a handle with a cross-section which is at least partially asymmetrical. Preferably, die set 66 is also finished to such high standards (including finish, dimension, and geometry) to allow extrusion of the substantially asymmetrical cross-sectioned handle as a hollow handle.

In order to extrude a handle with a straight (rather than curved) longitudinal axis, extrudate mass and cooling rate of a given cross-section of the handle should be equalized throughout the cross-section. Thus, the elements of die set 66 (e.g., an outer die and inner mandrel used to form a hollow handle) are preferably arranged such that the mass and cooling rate of the extrudate passing through the die set are equalized about the cross-section. In a preferred embodiment, mass and cooling rate are equalized about two mutually orthogonal planes cutting through the cross-section of the extrudate and intersecting each other along a line parallel to the direction of pull of the extrudate through die set 66. Thus, in the embodiment of FIGS. 2 and 4, the back portion of the handle (adjacent flat back side 49) preferably has a thinner wall thickness than the front portion of the handle (adjacent front side 48) to result in substantially equal mass flow along the back and front portions of the handle (about a plane of symmetry substantially parallel to flat back side 49 and cutting through longitudinal sides 44, 46 to divide the cross-section of the handle roughly in half).

Die set 66 preferably is designed such that a portion of rigid inner core 40 is not covered by covering layer 42, leaving an exposed portion 50. The simplest manner of achieving such result from die set 66 is to inhibit flow of covering layer material to a section of die set 66, such that a longitudinal strip of exposed inner core 40 is extruded without a covering layer 42 over it. It is noted that die set 66 may be configured to form the above-described grooves 52, 54 which may function to form a well in core 40 in which covering layer 42 is dammed to result in a clean demarcation of exposed portion 50.

The extrusion parameters of the extrusion method of the present invention depend upon the materials selected for the inner core and the covering layer (the extrudate) and are known or readily determinable by those skilled in the art. In particular, extruders 62, 64 subject the extrudate to sufficient heat and pressure to be capable of flowing into die set 66 at a desired production rate. In a preferred embodiment, for a 600 g/min throughput of handle forming material (preferably 570 g/min of inner core material and 30 g/min of covering layer material), the inner core material is extruded at a temperature of approximately 200° C. and a pressure of 40 bar and the covering layer material is extruded at a temperature of approximately 200° C. and a pressure of 100 Bar, such pressure difference improving uniformity of the covering layer over the inner core. Die set 66 is heated sufficiently to allow the extrudate to flow therethrough. In a preferred embodiment, die set 66 is heated to a temperature higher than that of the extrudate exiting extruders 62, 64 to enhance flow of the extrudate as it passes through die set 66. For the above-listed extrudate temperatures and pressures, the preferred temperature of die set 66 is 235° C. Such heating of die set 66 is particularly beneficial for extruding a thin thermoplastic layer over a thicker thermoplastic core material. The temperature of die set 66 is selected such that the covering layer material achieves good coverage over the inner core material and the co-extruded materials are sufficiently fused or bonded together for purposes of repeated usage of the resulting handle without the finished covering layer separating from the finished inner core.

The co-extrudate exiting from die set 66 is cooled in a first cooling tank 70 which is under vacuum. For example, a water vacuum tank such as a Conair GATTO DPC Vacuum Tank may be used. Typically, calibrators (e.g., in the form of templates through which the extrudate is passed to maintain proper size and shape of the extrudate within vacuum tank 70) are provided within vacuum cooling tank 70. The vacuum above the cooling medium in vacuum cooling tank 70 is regulated to control the dimensions of the co-extrudate passing through the tank and to maintain the stability of the shape and dimension of the co-extrudate. As one of ordinary skill in the art would appreciate, sufficient vacuum is required so that a hollow co-extrudate does not collapse. If desired, a detector system (not shown), such as a conventional laser beam detection arrangement or an ultrasonic detection system, may be provided to monitor the co-extrudate. The detector system may be used to control the vacuum above the coolant in cooling tank 70.

The co-extrudate optionally, though not necessarily, may be further cooled in a second cooling tank 72. For example, the co-extrudate may be cooled in a Conair GATTO Water Tank, at atmospheric pressure. It will appreciated that although water is the preferred cooling medium for both cooling tanks, any other refrigerant may be used with any necessary modification of manufacturing parameters being within the scope of the present invention.

The cooled co-extrudate is then passed through a friction puller 74. Any commercially available friction puller, such as the Conair GATTO CAT-A-PULLER Model 205-4, may be used. Friction puller 74 moves the coextrudate through a cutter 76 of known design, such as a Conair GATTO Cutter. Cutter 76 cuts the length of the co-extrudate moving therethrough to segments of preset length for use of the co-extrudate as a razor handle. Preferably, for aesthetic purposes, the co-extrudate is cut at an angle, as best shown in FIG. 3.

The marking of exposed portion 50, may be performed at any time after cooling of the co-extrudate is achieved. Preferably, marking of exposed portion 50 is performed after the co-extrudate exits friction puller 74 but before the co-extrudate is cut by cutter 76. In such manner, exposed portion 50 is properly oriented for receiving a marking. Moreover, puller 74 substantially isolates upstream co-extrudate from forces imparted on the co-extrudate by the equipment performing the marking. However, marking of exposed portion 50 may be performed at a location remote from the extruding equipment.

Any technique known in the art for marking exposed portion 50 may be used, such as hot stamping, ink transfer techniques (e.g., silk screen printing, rubber stamping, etc.), or surface modification (e.g., etching, engraving, etc.). In hot stamping, an ink ribbon is interposed between inner core 40 and a heated print head, and the heated print head is pressed into inner core 40. The heated print head melts the material of inner core 40 and creates an impression therein. The print head also melts the ink on the ink ribbon and deposits it into the impression created in the inner core.

In the manner described above, a soft-coated handle 14 of razor 10 with an area on which printed matter may be readily provided is formed by a simple, low-cost co-extrusion process.

While the invention has been shown and described herein with reference to particular embodiments, it is to be understood that the various additions, substitutions, or modifications of form, structure, arrangement, proportions, materials, and components and otherwise, used in the practice of the invention and which are particularly adapted to specific environments and operative requirements, may be made to the described embodiment without departing from the spirit and scope of the present invention. For example, the handle need not have the cross-sectional "U" shape or the exemplary embodiment, but may have any cross-sectional shape. Moreover, the exposed portion need not extend along the entire length of the razor handle. In addition, although co-extrusion is a preferred method of manufacture to facilitate formation of the exposed portion of the handle inner core, the exposed portion alternatively may be formed by providing a covering layer over the entire rigid inner core and then cutting or grinding away a portion of the covering layer to expose a portion of the rigid inner core where a manufacturer's brand name and/or logo may then be printed. The presently disclosed embodiments are therefore to be considered in all respects as illustrative and not restrictive, the scope of the invention being indicated by the appended claims, and not limited to the foregoing description.

What is claimed is:

1. A method of forming a shaving razor handle, said method comprising:
   inputting material for forming a rigid inner core of said handle and material for forming a covering layer over said rigid inner core into a dual input coaxial die set;
   co-extruding said rigid inner core material and said covering layer material through said die set to form said shaving razor handle with a covering layer over said rigid inner core;
   exposing a portion of said inner core by not providing covering layer over a portion of said inner core; and
   marking said exposed portion of said inner core.

2. A method of forming a shaving razor handle as in claim 1, wherein said first and second materials are compatible and bond directly together.

3. A method of forming a shaving razor handle as in claim 1, further comprising blocking flow of said second material through a portion of said die set while passing said first material through said die set portion thereby resulting in an exposed portion of said inner core exiting through said die set portion.

4. A method of forming a shaving razor handle as in claim 1, wherein said die set is shaped to form a hollow handle by extrusion of said first and second materials therethrough.

5. A method of forming a shaving razor handle as in claim 3, wherein said die set is shaped to form a handle having a cross-section which is at least partially asymmetrical.

6. A method of forming a shaving razor handle as in claim 1, further comprising the step of hot-stamping subject matter on said exposed portion of said inner core.

7. A method of forming a shaving razor handle, said method comprising extruding handle forming material through a die set fabricated with a sufficiently high standard of surface finish, dimension, and geometry to form a handle having a cross-section which is at least partially asymmetrical.

8. A method of forming a shaving razor handle as in claim 7, wherein the cross-section of said handle formed by extrusion is symmetrical about only one plane.

9. A method of forming a shaving razor handle as in claim 8, wherein said cross-section is in the shape of a closed U-shape.

10. A method of forming a shaving razor handle as in claim 7, further comprising:

extruding an inner core material; and co-extruding a covering layer material around said inner core material;

whereby the coextruded handle has an inner core covered by a covering layer.

11. A method of forming a shaving razor handle as in claim 7, further comprising extruding said handle forming material into a hollow handle.

12. A method of forming a shaving razor handle as in claim 7, further comprising extruding said handle forming material to form a handle with a substantially straight longitudinal axis.

13. A method of forming a shaving razor handle as in claim 7, further comprising maintaining high cylindricity of the die set during extruding.

* * * * *